Nov. 23, 1926.  
S. SHAFER, JR  
FRICTION CLUTCH  
Filed Sept. 18, 1924  
1,607,924  
2 Sheets-Sheet 1

Inventor,  
Samuel Shafer, Jr.  
By John S. Parker  
Attorney

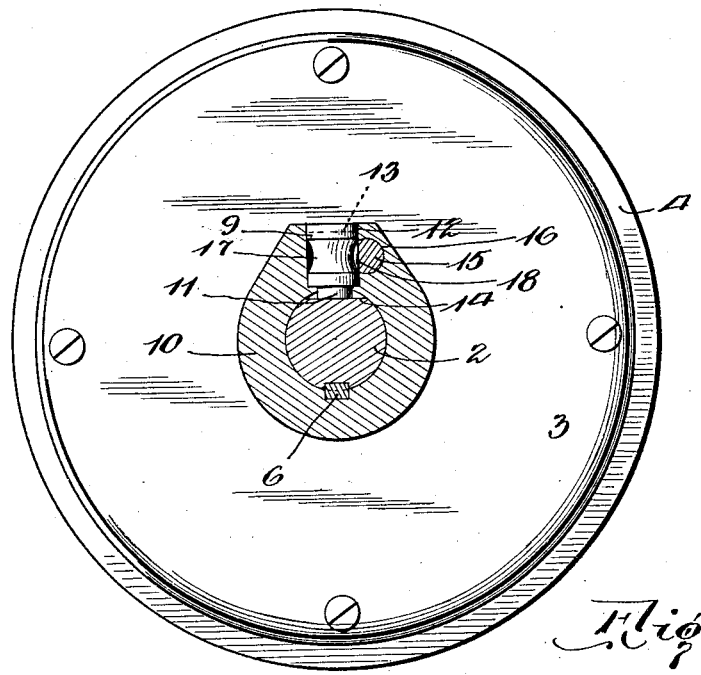
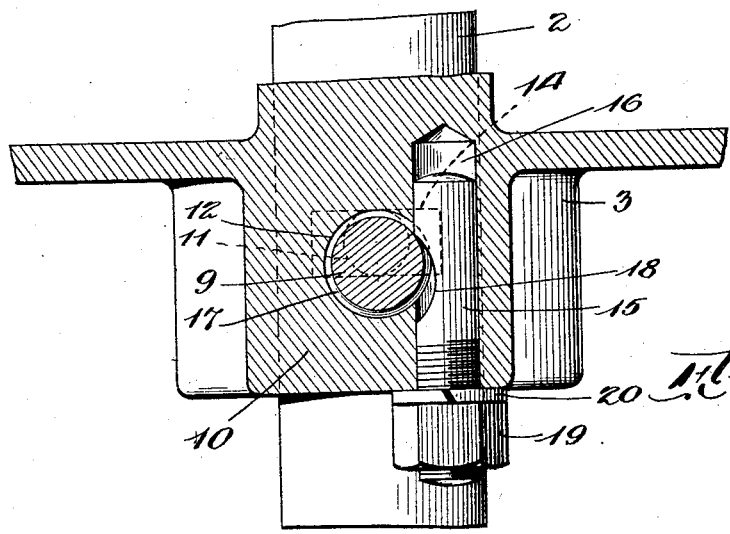

Patented Nov. 23, 1926.

1,607,924

UNITED STATES PATENT OFFICE.

SAMUEL SHAFER, JR., OF MILWAUKEE, WISCONSIN, ASSIGNOR TO CHAIN BELT COMPANY, OF MILWAUKEE, WISCONSIN, A CORPORATION OF WISCONSIN.

FRICTION CLUTCH.

Application filed September 18, 1924. Serial No. 738,469.

In the operation of friction clutches of the single face, cone type, the engaging faces of the co-operating elements gradually wear under use until the efficiency of the clutch is impaired or destroyed, unless the elements thereof are readjusted longitudinally of the shaft on which they operate so as to again bring their friction faces into proper relation with each other.

My invention has for its object to provide clutches of the type referred to with means by which one of the clutch elements may be adjusted longitudinally of the supporting shaft.

In the accompanying drawings—

Fig. 2 is a transverse sectional view taken on the line II—II of Fig. 1.

Fig. 3 is a horizontal sectional view on the line III—III of Fig. 1.

Figure 1:
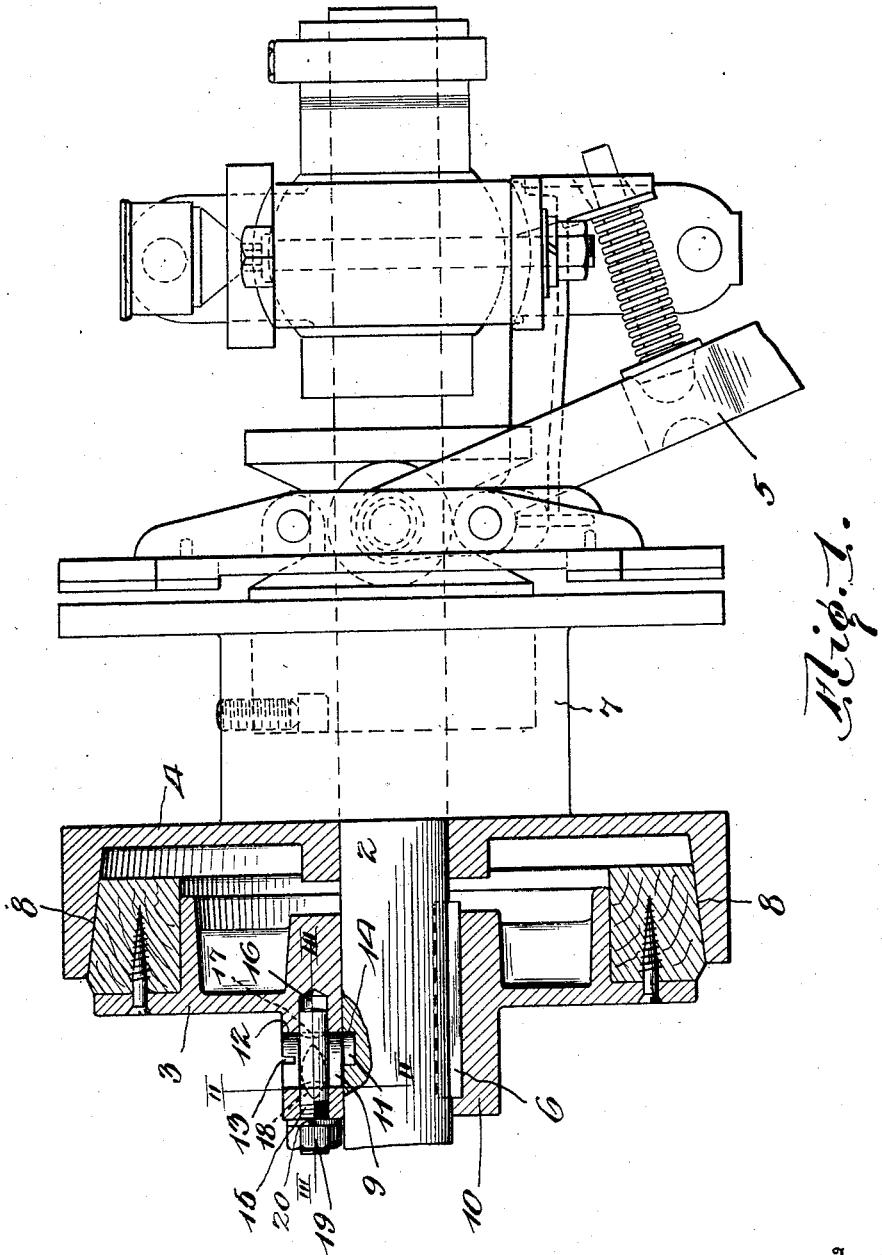
Fig. 1 is a longitudinal sectional view of a friction clutch of well known type to which my invention is applied.

Referring to the drawings, 2 designates the shaft upon which the clutch is supported, which clutch comprises the normally fixed element 3, the manually adjustable element 4, and manually controlled means, 5, by which the clutch is operated. The clutch illustrated is of the cone, friction type, but my invention is not limited to use and co-operation with any particular form of clutch. The clutch element 3 is united with the shaft 2 by a spline 6 that causes the shaft and clutch element to rotate together, but permits longitudinal movement of one relative to the other. The clutch element 4 is loose upon the shaft, and in the instance illustrated is provided with a drum 7, upon which may be wound a hoisting cable.

The engaging and co-operating faces 8 of the clutch elements wear from use, and unless compensation be made therefor the clutch eventually becomes inefficient and fails to function. It has heretofore been the custom to mount the stationary element 3 of the clutch in a fixed position upon the shaft, and to readjust it when this becomes necessary through the wear of parts, and this operation has been one requiring considerable time and skill to properly perform.

My invention contemplates the use of adjusting means that may be easily manipulated for moving the clutch element 3 longitudinally upon its shaft, and then set to maintain the moved part in its newly adjusted position, the clutch element being, as stated, connected with the shaft so that it is free to move longitudinally thereon. The preferred form of adjusting means comprises a cylindrical pin 9 seated in a diametric aperture 12, of a size to accurately fit the pin formed in the hub 10 of the clutch element 3. The pin is provided at one end with an eccentric projection 11, preferably cylindrical in form, that is adapted to lie in a transversely arranged straight groove 14, cut in the peripheral portion of the shaft to receive it, the cross dimension of the groove being preferably equal to the diameter of the eccentric projection 11 so that there is a close fit between the projection and the opposite side walls of the slot or groove when the pin is in place. The end of the pin opposite that carrying the projection 11 is formed to receive a tool by which the pin may be turned in its seat 12, being represented as formed with a transverse kerf 13 to receive the bit of a screw driver. When the pin is in place as represented in the drawings, its cylindrical portion being fitted in a seat in the hub of the clutch member 3 and its eccentric portion fitting into a transverse slot or groove formed in the shaft, it follows that rotation of the pin will cause the clutch member to be moved longitudinally upon the shaft, in one direction or the other accordingly as the pin is turned, the eccentric projection 11 in the meantime traveling longitudinally in the slot 14.

Provision must be made for locking the pin 9 in the positions to which it may be adjusted, and for this purpose I prefer to employ a locking pin 15 that is adapted to enter a hole 16 formed therefor in the hub of the clutch element 3. This hole intersects the aperture 12 in which is seated the adjusting pin, so that when the two pins, 9 and 15, are properly seated, the locking pin intersects the adjusting pin tangentially and lies in a circumferential groove 17 formed in the pin 9. A portion of the locking pin is cut away, as indicated at 18, where the two pins intersect. The end of the pin 15 that is exposed is screw-threaded to receive a nut 19, between which and the end face of the hub is a locking washer 20. The nut 19 may be adjusted upon the bolt 15 so that the latter may be moved to bring the central portion of the cut-away part 18 opposite the adjusting pin, which latter is then free to be rotated. When, however, the nut 19 is turned so as to draw the locking pin firmly into engagement with the adjusting pin, as represented in Fig. 3 of the drawing, the adjusting pin is locked, as will be readily understood. Other means for locking the adjusting pin might be substituted for those shown, but the form illustrated is practical, and the one which I prefer to use. It will be seen that by means of my invention the clutch element 3 may be adjusted so that the working faces of the clutch are brought into proper working relationship with each other, that this adjustment may be easily and quickly effected and may be made with the utmost delicacy and nicety, and that after having been effected the adjusting means, which also serve to hold the parts in position to which they are adjusted, may be easily and quickly locked in position. The adjusting mechanism shown is inexpensive to equip and maintain, and is not liable to get out of order, under conditions to which it may be subjected when the clutch is in use.

What I claim is:

1. The combination of a shaft in the periphery of which is formed a transverse groove, the elements of a friction clutch, one of which is secured to the shaft so as to rotate therewith, and is free to be moved along the shaft, and is formed with a hub in which is a radial opening a cylindrical pin fitting the radial opening in the hub of the said clutch element, and having an eccentric portion that enters the transverse groove in the shaft, whereby rotation of the pin causes relative longitudinal movement between the shaft and clutch element, and means for locking the pin after adjustment.

2. The combination with the elements of a friction clutch and the shaft on which they are supported, one of said elements being secured to the shaft so it shall rotate therewith but is free to be moved longitudinally relative to the same, of a cylindrical adjusting pin fitted in a radial seat formed therefor in the said clutch element, the pin being formed at one end to be engaged by a tool employed to turn the pin in its seat, and at its other end provided with an eccentric cylindrical projection fitting in a transverse groove formed in the peripheral portion of the shaft, and means for locking the pin against rotation after it has been adjusted.

3. The combination stated in claim 1 wherein the adjusting pin is formed with a circumferential groove and wherein also the means for locking such pin consist of a pin lying in the circumferential groove of the adjusting pin and cut away opposite the latter, and means for adjusting the locking pin in the direction of its length.

SAMUEL SHAFER, Jr.